Oct. 13, 1931.  P. M. WEAMER  1,827,127
METHOD OF ORNAMENTING RUBBER MATS
Filed Dec. 27, 1929
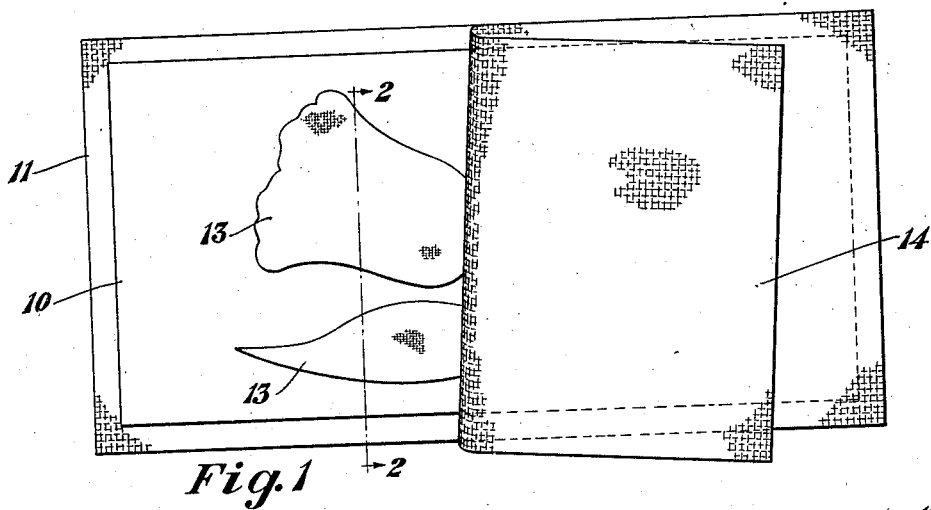
Fig. 1
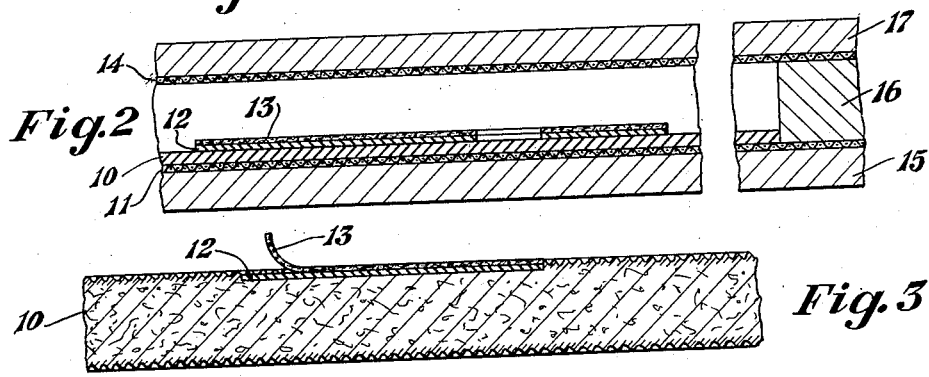
Fig. 2
Fig. 3
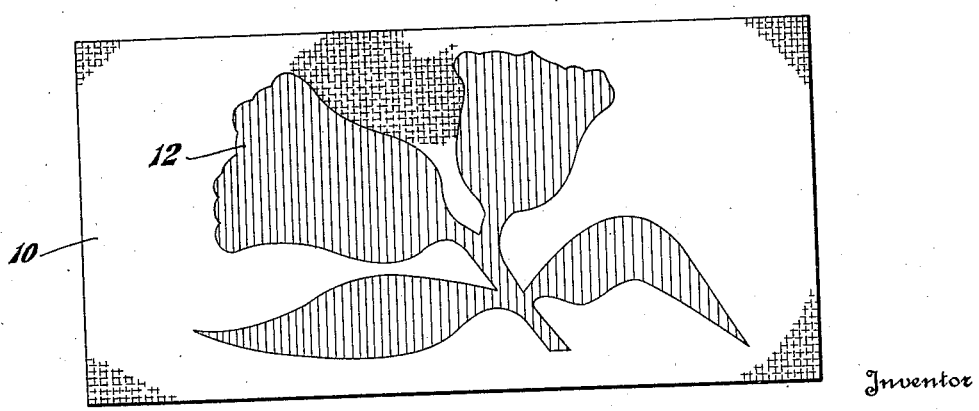
Fig. 4
Inventor
Paul M. Weamer,
By Robert M. Pierson,
Attorney Patented Oct. 13, 1931

1,827,127

UNITED STATES PATENT OFFICE

PAUL M. WEAMER, OF GLADWYNE, PENNSYLVANIA, ASSIGNOR TO LEE RUBBER & TIRE CORPORATION, OF CONSHOHOCKEN, PENNSYLVANIA, A CORPORATION OF NEW YORK

METHOD OF ORNAMENTING RUBBER MATS

Application filed December 27, 1929. Serial No. 416,820.

This invention relates to the manufacture of ornamented sponge-rubber articles including sheets particularly adapted for mats for tables, bathrooms, floors, etc.

My object is to provide a relatively inexpensive method for securing novel ornamental effects and obtaining an improved product. Heretofore, the methods of ornamentation employed have involved a high cost of production and have given unsatisfactory results, so that rubber mats ornamented in contrasting colors have not come into extensive use. By means of my invention these articles can be produced in a large variety of attractive designs and colors at a low cost of production.

Of the accompanying drawings, Fig. 1 is a plan view illustrating the preferred mode of assembling the component parts of an ornamented sponge-rubber mat, together with associated fabric sheets, in accordance with my invention, omitting the vulcanizing mold.

Fig. 2 is a partial vertical section on the line 2—2 of Fig. 1, showing the vulcanizing mold with the raw mat therein.

Fig. 3 is a vertical section on a larger scale, illustrating a portion of the vulcanized product undergoing the final step in its manufacture.

Fig. 4 is a plan view of the finished mat.

In proceeding in the preferred manner, I provide a foundation or body sheet 10 of vulcanizable soft-rubber composition containing a gasifying ingredient and a pigment to impart the desired color, and lay it on a supporting surface which may be a molding sheet 11 of coarse or fine woven cloth intended to impart a woven-fabric impression to the lower side of the mat during the vulcanizing operation. If a smooth lower surface is desired, the foundation sheet may be vulcanized directly against a smooth metallic mold plate.

Over the foundation sheet 10, within the latter's margins, is laid a smaller sheet 12, preferably of a heat-plastic nature such as vulcanizable, solid, soft-rubber composition containing a pigment of a different color from that of said foundation sheet, to form a thin, ornamental inlay. This inlay sheet is faced on its upper side with a protective backing sheet 13 such as smooth holland cloth, treated paper or other suitable non-sticking inextensible material adapted to be stripped from the rubber sheet 12. The inlay sheet is outlined to represent any suitable ornamental shape, and these shapes may be died or cut out of a larger sheet of the colored gum calendered on or otherwise applied to the holland sheet.

Over the assembled sheets 10, 12 and 13 is placed a cloth molding sheet 14 which may be of coarse or fine weave similar to or differing from the lower cloth sheet 11. The assembling of the mat sheets upon the molding sheet 11 is preferably performed upon the lower plate 15 of a vulcanizing mold, after which the middle plate 16 of said mold, defining the sides of the molding cavity, is placed over said cloth sheet, around the mat sheets, then the upper cloth sheet 14 is laid over the middle plate and over its mold cavity, and finally the top mold plate 17 is applied, substantially as illustrated in Fig. 2. The cloth sheets 11 and 14 then form molding surfaces and also serve to vent the interior of the mold, permitting the escape therefrom of gases and vapors evolved at the surfaces of the rubber composition during vulcanization.

The vulcanizing heat is then applied and causes the body sheet 10 to assume a sponged condition and fill the mold. The sheets 10 and 12 are vulcanized and firmly united to each other, the surfaces of the foundation sheet are partly forced through the meshes of the fabric sheets 11 and 14, forming thin skins of solid rubber bearing a roughened fabric impression at the upper and lower surfaces of the sponge-rubber foundation sheet, and at the same time the solid-rubber ornamenting sheet 12 becomes inlaid or embedded in the top face of the foundation sheet slightly below the surrounding roughened surface. The solid-rubber ornamenting sheet 12, being applied to the inextensible backing sheet 13 and also having a greater viscosity than the aerated rubber of the foundation sheet when the two are softened by the vulcanizing heat, will not flow substantially during vulcanization, but the sponge rubber will flow around and embed it and the inlaid ornament will have sharply-defined edges in the finished product.

The mold is then opened, the fabric sheets 11 and 14 are stripped off, and the final step consists in peeling or stripping off the holland sheet 13 from the face of the ornamental inlay sheet 12. This method can be more readily carried out with a sponge-rubber foundation sheet than with one of solid rubber due to the requirement of a much smaller molding pressure in vulcanizing the sponge rubber, which avoids a strong adhesion of the holland to the vulcanized surface of the inlay sheet 12 and permits the holland to be stripped away after the vulcanizing operation without injury to the inlay. The result is a sponge-rubber sheet or mat attractively ornamented with an inlay of solid rubber of a contrasting color. An ornamental inlay might obviously be applied in like manner to the lower surface of the foundation sheet.

This article can be produced to sell at a reasonable price which widely extends its usefulness as compared with products produced by prior methods. The product is also of better quality by reason, partly, of the sharply-defined edges of the inlay, and it will withstand severe usage, the edges of the inlay being protected against stripping off by the surrounding sponge rubber, notwithstanding the highly yielding character of the latter. The fabric-impression surface imparts an attractive appearance and adds to the non-slipping qualities and the softness or yielding character of the mat.

The described steps and features could be varied within the scope of my invention and I do not wish to be limited except as required by the claims and the prior art.

I claim:

1. The method of making ornamented sponge-rubber sheets which comprises applying to a foundation sheet of sponge-rubber composition a smaller plastic ornamenting sheet backed by a removable protector, overlaying the two with a cloth molding sheet, vulcanizing the foundation sheet against said cloth sheet, thereby embedding the ornamenting sheet in the face of the foundation sheet, removing the molding sheet and then removing the protector.

2. The method of making ornamented sponge-rubber sheets which comprises superimposing upon a foundation sheet of sponge-rubber composition a smaller ornamenting sheet of solid-rubber composition having a backing of holland, overlaying the two with a cloth molding sheet, vulcanizing the two together against said cloth sheet and embedding the ornamenting sheet in the face of the foundation sheet by the swelling and flow of the latter, removing the cloth sheet and then stripping off the holland sheet.

In witness whereof I have hereunto set my hand this 23 day of December, 1929.

PAUL M. WEAMER.